United States Patent
Zhou

(10) Patent No.: US 10,401,469 B2
(45) Date of Patent: Sep. 3, 2019

(54) POSITIONING METHODS AND DEVICES

(71) Applicant: Beijing Zhigu Rui Tuo Tech Co., Ltd., Beijing (CN)

(72) Inventor: Hanning Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 309 days.

(21) Appl. No.: 15/323,403

(22) PCT Filed: Jun. 5, 2015

(86) PCT No.: PCT/CN2015/080840
§ 371 (c)(1),
(2) Date: Dec. 30, 2016

(87) PCT Pub. No.: WO2016/000512
PCT Pub. Date: Jan. 7, 2016

(65) Prior Publication Data
US 2017/0160376 A1 Jun. 8, 2017

(30) Foreign Application Priority Data
Jul. 4, 2014 (CN) .......................... 2014 1 0320908

(51) Int. Cl.
*G01S 5/02* (2010.01)
(52) U.S. Cl.
CPC .............. *G01S 5/0252* (2013.01); *G01S 5/02* (2013.01); *G01S 5/0221* (2013.01); *G01S 5/0268* (2013.01)
(58) Field of Classification Search
CPC ........ H04W 72/1231; H04B 7/04; H04B 7/02
See application file for complete search history.

(56) References Cited

U.S. PATENT DOCUMENTS 7,313,403 B2  12/2007  Gong et al.
8,674,878 B2   3/2014  Wu et al.
(Continued)

FOREIGN PATENT DOCUMENTS

CN   1864344 A   11/2006
CN  102157021 A   8/2011
(Continued)

OTHER PUBLICATIONS

International Search Report for PCT Application No. PCT/CN2015/080840, dated Sep. 14, 2015, 5 pages.

*Primary Examiner* — Marisol Figueroa
(74) *Attorney, Agent, or Firm* — Amin, Turocy & Watson, LLP

(57) ABSTRACT

Positioning methods and devices are described, which relate to the field of positioning. A method comprises: acquiring a group of transmission parameters of a wireless energy transmission device; determining N groups of reference transmission parameters from multiple groups of reference transmission parameters according to the group of transmission parameters, where N is a positive integer; and determining, according to the N groups of reference transmission parameters, one receiving position of a wireless energy receiving device corresponding to the wireless energy transmission device. In this regard, a correspondence that exists between a receiving position of a wireless energy receiving device and a transmission parameter of a wireless energy transmission device can be used to implement positioning of the wireless energy receiving device.

21 Claims, 5 Drawing Sheets

(56) References Cited

U.S. PATENT DOCUMENTS

| | | | |
|---|---|---|---|
| 2009/0111483 A1* | 4/2009 | Fiereizen | G01S 1/08 |
| | | | 455/456.1 |
| 2010/0033021 A1 | 2/2010 | Bennett | |
| 2010/0309051 A1 | 12/2010 | Moshfeghi | |
| 2012/0193999 A1 | 8/2012 | Zeine | |
| 2013/0137455 A1 | 5/2013 | Xia et al. | |

FOREIGN PATENT DOCUMENTS

| | | |
|---|---|---|
| CN | 102157990 A | 8/2011 |
| CN | 102280944 A | 12/2011 |
| CN | 102404843 A | 4/2012 |
| CN | 103812229 A | 5/2014 |
| CN | 103812230 A | 5/2014 |
| CN | 104090265 A | 10/2014 |
| JP | 2008177779 A | 7/2008 |
| WO | 2012095922 A1 | 7/2012 |
| WO | 2015124030 A1 | 8/2015 |

\* cited by examiner

POSITIONING METHODS AND DEVICES

RELATED APPLICATION

The present application is a U.S. National Stage filing under 35 U.S.C. § 371 of international patent cooperation treaty (PCT) application No. PCT/CN2015/080840, filed Jun. 5, 2015, and entitled "Positioning Methods and Devices", which claims the benefit of priority to Chinese Patent Application No. 201410320908.0, filed on Jul. 4, 2014, which applications are hereby incorporated into the present application by reference herein in their respective entireties.

TECHNICAL FIELD

The present application relates to the field of positioning, and in particular, to positioning methods and devices.

BACKGROUND

Indoor positioning is a technology for achieving positioning in an indoor environment. Generally multiple technologies such as wireless communication, base station positioning, and inertial navigation positioning are mainly used to form an indoor positioning system, so as to implement monitoring of positions of people and objects in an indoor space. These indoor positioning technologies usually have low precision of positioning.

SUMMARY

An example, non-limiting objective of the present application is to provide a positioning method and device.

According to an aspect of at least one example embodiment of the present application, a positioning method is provided, the method comprising:

acquiring a group of transmission parameters of a wireless energy transmission device;

determining N groups of reference transmission parameters from multiple groups of reference transmission parameters according to the group of transmission parameters, where N is a positive integer; and determining, according to the N groups of reference transmission parameters, one receiving position of a wireless energy receiving device corresponding to the wireless energy transmission device.

According to another aspect of at least one example embodiment of the present application, a positioning device is provided, the device comprising:

a transmission parameter acquisition module, configured to acquire a group of transmission parameters of a wireless energy transmission device;

a reference transmission parameter determination module, configured to determine N groups of reference transmission parameters from multiple groups of reference transmission parameters according to the group of transmission parameters, where N is a positive integer; and a receiving position determination module, configured to determine, according to the N groups of reference transmission parameters, one receiving position of a wireless energy receiving device corresponding to the wireless energy transmission device.

For the positioning methods and devices in one or more of the example embodiments of the present application, a correspondence that exists between a receiving position of a wireless energy receiving device and a transmission parameter of a wireless energy transmission device is used to implement positioning of the wireless energy receiving device.

DETAILED DESCRIPTION

Example embodiments of the present application are further described in detail below with reference to the accompanying drawings and embodiments. The following embodiments are intended to describe the present application, but not to limit the scope of the present application.

It should be understood by a person skilled in the art that in embodiments of the present application, the value of the serial number of each step described above does not mean an execution sequence, and the execution sequence of each step should be determined according to the function and internal logic thereof, and should not be any limitation on the implementation procedure of the embodiments of the present application.

With the development of wireless energy transmission technologies, a wireless energy transmission technology is used for charging on more and more electronic devices. Moreover, a wireless energy transmission device, that is, a transmit end, usually has thousands of phase array antennas to implement long-distance wireless energy transmission. During charging, the wireless energy transmission device keeps receiving feedback from a wireless energy receiving device, so as to adjust a corresponding transmission parameter (for example, a phase), so that the wireless energy receiving device achieves the highest energy receiving efficiency at a position where the wireless energy receiving device is located. In a case where energy receiving efficiency of a wireless energy receiving device reaches the maximum value, a certain correspondence exists between a receiving position of the wireless energy receiving device and a transmission parameter of a wireless energy transmission device, and positioning of the wireless energy receiving device may be implemented according to the correspondence, so that a new positioning method is proposed.

Figure 1:
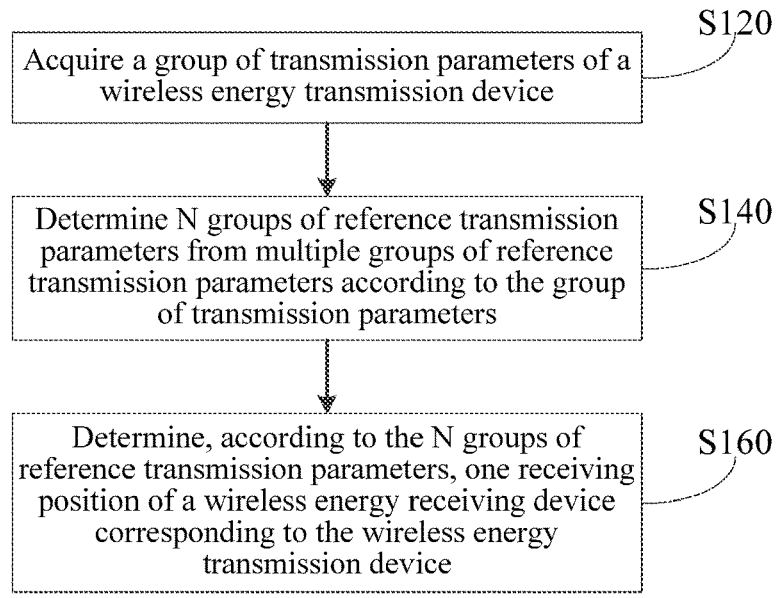
FIG. 1 is a flowchart of the positioning method according to an example embodiment of the present application.

FIG. 1 is a flowchart of the positioning method according to an embodiment of the present application. The method may be implemented, for example, on a positioning device. As shown in FIG. 1, the method comprises:

S120: Acquire a group of transmission parameters of a wireless energy transmission device.

S140: Determine N groups of reference transmission parameters from multiple groups of reference transmission parameters according to the group of transmission parameters, where N is a positive integer.

S160: Determine, according to the N groups of reference transmission parameters, one receiving position of a wireless energy receiving device corresponding to the wireless energy transmission device.

In the method in the embodiment of the present application, a group of transmission parameters of a wireless energy transmission device are acquired, N groups of reference transmission parameters are determined according to the group of transmission parameters, and a receiving position of a wireless energy receiving device is further determined, thereby implementing positioning of the wireless energy receiving device.

The functions of steps S120, S140, and S160 are described in detail below with reference to example embodiments.

S120: Acquire a group of transmission parameters of a wireless energy transmission device.

In an example embodiment, the transmission parameter comprises: at least one of an antenna array direction, an antenna array angle, and an antenna phase combination of the wireless energy transmission device.

In another example embodiment, the transmission parameter comprises: an antenna combination subset of the wireless energy transmission device, and at least one of an antenna array direction, an antenna array angle, and an antenna phase combination in the antenna combination subset. Compared with the former example embodiment, in this example embodiment, all antennas of the wireless energy transmission device are not configured to transmit energy to the wireless energy receiving device, and instead merely some of the antennas transmit energy to the wireless energy receiving device.

In an example embodiment, step S120 may further comprise:

S120': Acquire the group of transmission parameters of the wireless energy transmission device in response to that energy receiving efficiency of the wireless energy receiving device reaches a predetermined ratio of the highest efficiency at the receiving position.

In an example embodiment, the energy receiving efficiency η of the wireless energy receiving device is defined by the following formula:

$$\eta = \frac{e_{received}}{e_{sent}}$$

where $e_{received}$ is energy received by the wireless energy receiving device, and $e_{sent}$ is energy sent by the wireless energy sending device. Therefore, the energy receiving efficiency η of the wireless energy receiving device is a ratio of the energy received by the wireless energy receiving device to the energy sent by the wireless energy sending device. In an optimal lossless wireless energy transmission state, the energy receiving efficiency η is equal to 1, while in a common transmission state, the energy receiving efficiency η is a value smaller than 1. When the value is closer to 1, it indicates that a loss in a process of wireless energy transmission is smaller, and the energy receiving efficiency η is higher.

A value of the predetermined ratio may be 0% to 100%. In a case where the predetermined ratio is 100%, it represents that the group of transmission parameters of the wireless energy transmission device are acquired in response to that the energy receiving efficiency of the wireless energy receiving device reaches the highest efficiency at the receiving position.

Figure 2:
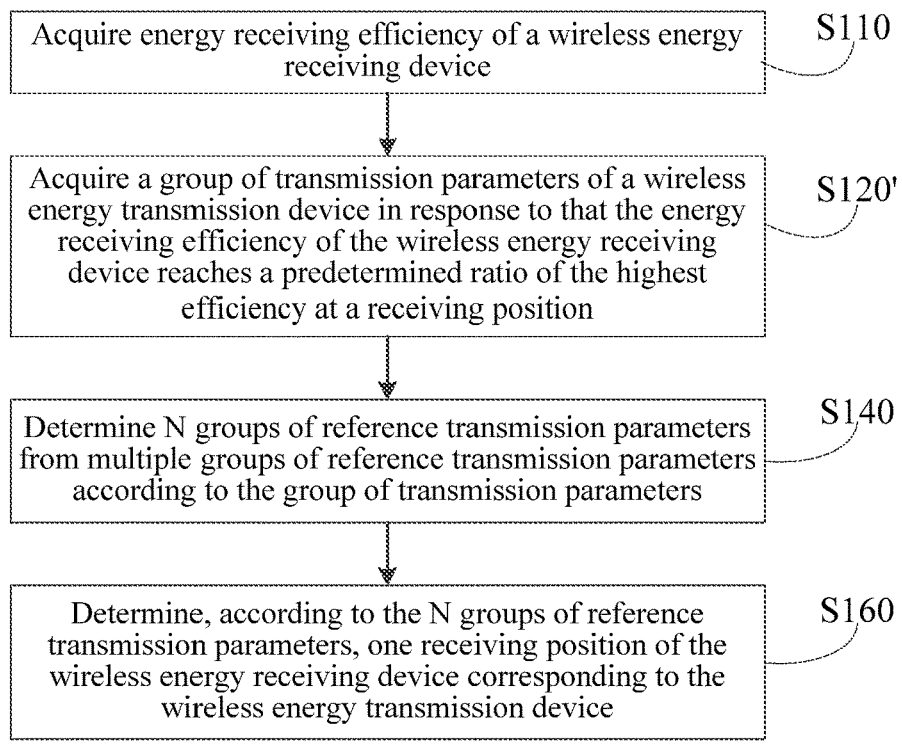
FIG. 2 is a flowchart of the positioning method according to an example embodiment of the present application.

To monitor whether the energy receiving efficiency of the wireless energy receiving device reaches the predetermined ratio of the highest efficiency at the receiving position, in an example embodiment, referring to FIG. 2, the method further comprises:

S110: Acquire the energy receiving efficiency of the wireless energy receiving device.

The wireless energy receiving device may actively or passively feedback energy receiving efficiency of the wireless energy receiving device to the positioning device at a fixed interval. In response to that the energy receiving efficiency of the wireless energy receiving device no longer increases along with adjustment of the transmission parameter of the wireless energy transmission device, it may be determined that the energy receiving efficiency of the wireless energy receiving device has reached the highest efficiency at a current position of the wireless energy receiving device. If the predetermined ratio is less than 100%, because the highest efficiency at the receiving position of the wireless energy receiving device cannot be known in advance, the transmission parameter of the wireless energy transmission device usually can be first adjusted till the receiving efficiency of the wireless energy receiving device reaches the highest efficiency, so that the receiving efficiency of the wireless energy receiving device is further adjusted to the predetermined ratio of the highest efficiency.

Under the influence of a distance between the wireless energy transmission device and the wireless energy receiving device and an obstacle between the wireless energy transmission device and the wireless energy receiving device, when the wireless energy receiving device is located at a different position, the highest energy receiving efficiency η that the wireless energy receiving device can obtain may be different. For example, in response to a case where a mobile phone is placed at a position near the wireless energy transmission device and there is no obstacle, the highest energy receiving efficiency η that the mobile phone can obtain may reach 80%. In response to a case where a tablet computer is placed at a position far away from the wireless energy transmission device and multiple obstacles exist between the tablet computer and the wireless energy transmission device, the highest energy receiving efficiency η that the tablet computer can obtain can only reach 40%.

In a case where the energy receiving efficiency η of the wireless energy receiving device reaches the highest efficiency at the current position, a one-to-one correspondence exists between the transmission parameter of the wireless energy transmission device and the receiving position of the wireless energy receiving device. When the receiving efficiency η of the wireless energy receiving device is less than the highest efficiency, for example, reaches 80% of the highest efficiency at the current receiving position where the wireless energy receiving device is located, a one-to-M correspondence exists between the transmission parameter of the wireless energy transmission device and the receiving position of the wireless energy receiving device, where M is a positive integer. Compared with an open environment such as an outdoor environment, in an environment having multiple obstacles, for example, an indoor environment, the value of M is smaller, and the value of M is usually 1, 2.

Therefore, in step S120', in a case where the predetermined ratio is 100%, a one-to-one correspondence exists between the transmission parameter of the wireless energy transmission device and the receiving position of the wireless energy receiving device, a more desirable positioning effect is achieved for the wireless energy receiving device.

S140: Determine N groups of reference transmission parameters from multiple groups of reference transmission parameters according to the group of transmission parameters, where N is a positive integer.

In this step, the N groups of reference transmission parameters may be determined on the basis of a degree of similarity between the group of transmission parameters and each group among the multiple groups of reference transmission parameters.

In an example embodiment, it may be assumed that the reference transmission parameter comprises: an antenna combination subset of the wireless energy transmission device, and an antenna array direction, an antenna array angle, and an antenna phase combination in the antenna combination subset. The value of the phase may be discretized into a multiple of $\pi/2$, for example, 0, $\pi/2$, $\pi$, $3\pi/2$. The direction and angle may be denoted as one vector in a spherical coordinate system (reference may be made to http://baike.baidu.com/view/1196991.htm), the vector comprises angle $\theta$ and direction $\varphi$, the values of both are discretized into a multiple of $\pi/36$, for example, 0, $\pi/36$, $\pi/18$, $\pi/12$, and the like. By using an example of an antenna combination subset formed of three antenna nodes, a vector corresponding to a group of reference transmission parameters corresponding to the antenna combination subset is V=[phase1, $\theta$1, $\varphi$1, phase2, $\theta$2, $\varphi$2, phase3, $\theta$3, $\varphi$3].

It is assumed that the vector corresponding to the group of transmission parameters is $V_0$, the multiple groups of reference transmission parameters are sequentially $V_1$, $V_2$, $V_3$, ..., and cosine degrees of similarity between $V_0$ and $V_1$, $V_2$, $V_3$, ... may be sequentially calculated as the degrees of similarity:

$$S_1=(V_0*V_1)/(|V_0||V_1|);$$

$$S_2=(V_0*V_2)/(|V_0||V_2|);$$

$$S_3=(V_0*V_3)/(|V_0||V_3|);$$

where, * represents a vector dot-product operation.

In an example embodiment, degrees of similarity between the N groups of reference transmission parameters and the group of transmission parameters are greater than a threshold. The threshold may be, for example, 90%.

In another example embodiment, the N groups of reference transmission parameters are N groups of reference transmission parameters having the highest degrees of similarity with the group of transmission parameters among the multiple groups of reference transmission parameters. Specifically, a degree of similarity between the group of transmission parameters and each of the multiple groups of reference transmission parameters may be calculated separately, the multiple groups of reference transmission parameters are arranged in a descending order of degree of similarity, and the first N reference transmission parameters are then used as the N groups of reference transmission parameters having the highest degrees of similarity with the group of transmission parameters. That is to say, the N groups of reference transmission parameters are the first N reference transmission parameters after the multiple groups of reference transmission parameters are arranged in a descending order of degrees of similarity with the group of transmission parameters.

In addition, in a case of searching the multiple groups of reference transmission parameters for a group of reference transmission parameter having the highest degree of similarity with the transmission parameter, to shorten a search time, a method, for example, a K-D tree (http://en.wikipedia.org/wiki/K-d_tree) method or a locality sensitive hashing (http://blog.csdn.net/icvpr/article/details/12342159) method, may be used to first obtain a nearest neighbor set, and a linear search method is then used to find, in this set, the reference transmission parameter corresponding to the vector having the highest degree of similarity.

S160: Determine, according to the N groups of reference transmission parameters, one receiving position of a wireless energy receiving device corresponding to the wireless energy transmission device.

Figure 3:
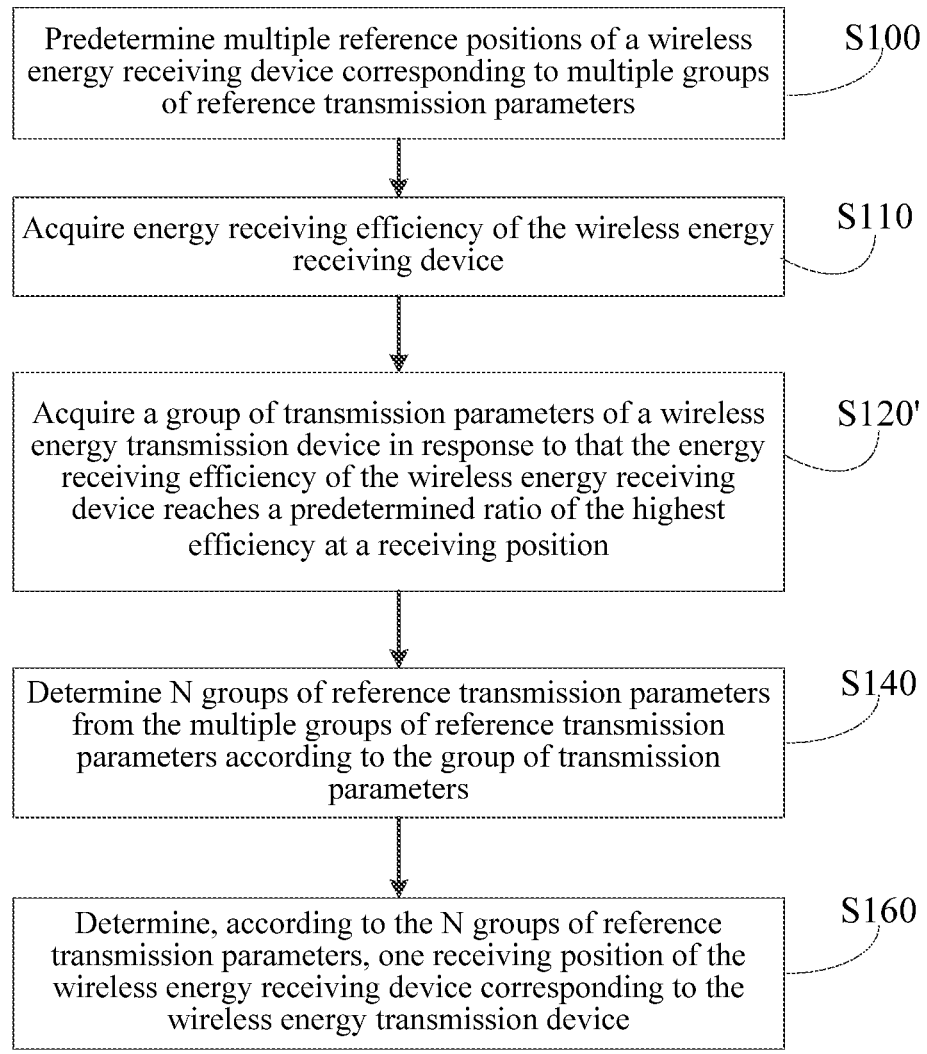
FIG. 3 is a flowchart of the positioning method of another example embodiment of the present application.

As discussed above, the N groups of reference transmission parameters correspond to at least N reference positions. In the step, the receiving position may be determined according to at least N reference positions of the wireless energy receiving device corresponding to the N groups of reference transmission parameters. A correspondence between the reference transmission parameter and the reference position may be predetermined, and in an example embodiment, referring to FIG. 3, the method may further comprise:

S100: Predetermine multiple reference positions of the wireless energy receiving device corresponding to the multiple groups of reference transmission parameters.

Specifically, the wireless energy receiving device may be placed at a position in advance, the transmission parameter of the wireless energy transmission device is then adjusted till the energy receiving efficiency of the wireless energy receiving device reaches a predetermined ratio of the highest efficiency at a current position, and the current transmission parameter of the wireless energy transmission device and the position of the wireless energy receiving device corresponding to the transmission parameter are recorded. Similarly, multiple reference positions of the wireless energy receiving device corresponding to the multiple groups of reference transmission parameters may be obtained. In response to that the predetermined ratio is 100%, the number of the reference transmission parameters is equal to that of the reference positions. In response to that the predetermined ratio is smaller than 100%, the number of the reference transmission parameters may be smaller than that of the reference position.

In step S160, in an example embodiment, N is 1, and the receiving position is determined according to at least one reference position of the wireless energy receiving device corresponding to the N groups of reference transmission parameters.

In a case where the predetermined ratio is 100%, one group of reference transmission parameters corresponds to only one reference position of the wireless energy receiving device, and the one reference position may be directly used as the receiving position.

In a case where the predetermined ratio is less than 100%, one group of reference transmission parameters may correspond to multiple reference positions of the wireless energy receiving device, and one of the multiple reference positions may be randomly selected as the receiving position, or, a central point of the multiple reference positions is calculated as the receiving position.

In another example embodiment, N is greater than 1, and step S160 may comprise:

S161: Acquire at least N reference positions of the wireless energy transmission device corresponding to the N groups of reference transmission parameters.

S162: Perform calculation according to the at least N reference positions to obtain the receiving position.

In a case where the predetermined ratio is 100%, N groups of reference transmission parameters correspond to N reference positions of the wireless energy receiving device, and a central point of the N reference positions may be calculated as the receiving position.

In a case where the predetermined ratio is less than 100%, one group of reference transmission parameters may correspond to multiple reference positions of the wireless energy receiving device, and one of the multiple reference positions may be randomly selected as a representative reference position, or, a central point of the multiple reference positions is calculated as a representative reference position. In step S162, the foregoing operations are separately performed on the reference positions corresponding to the N groups of reference transmission parameters, and N representative reference positions may be obtained according to at least N reference positions corresponding to the N groups of reference transmission parameters, and further a central point of the N representative reference positions may be calculated as the receiving position.

The receiving position is a spatial coordinate position, that is, a three-dimensional coordinate position.

In addition, the present application embodiment further provides a computer readable medium, and comprises a computer readable instruction that executes, when being run, the following operations: executing the operations of steps S120, S140, and S160 in the method in the example embodiment shown in FIG. 1.

In conclusion, in the method in the embodiment of the present application, multiple reference positions of a wireless energy receiving device corresponding to multiple groups of reference transmission parameters may be predetermined, and a receiving position of the wireless energy receiving device is further determined according to a group of transmission parameters of the wireless energy transmission device, so as to implement positioning of the wireless energy receiving device. In a case where the wireless energy transmission device has thousands of or more antennas, precise positioning of the wireless energy receiving device may be achieved.

Figure 4:
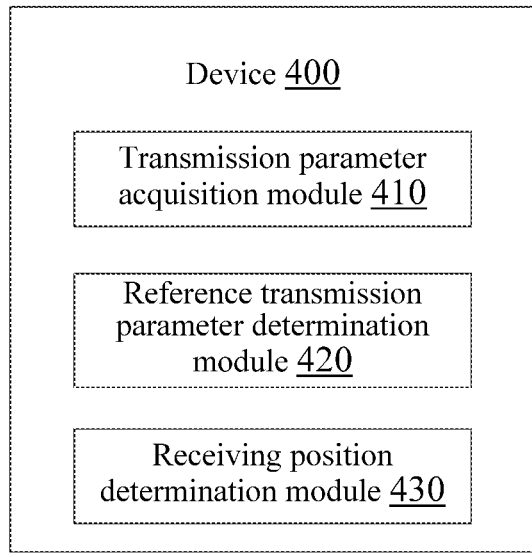
FIG. 4 is a schematic structural diagram of modules of the positioning device according to an example embodiment of the present application.

FIG. 4 is a schematic structural diagram of modules of the positioning device according to an embodiment of the present application. As shown in FIG. 4, the device 400 may comprise:

a transmission parameter acquisition module 410, configured to acquire a group of transmission parameters of a wireless energy transmission device;

a reference transmission parameter determination module 420, configured to determine N groups of reference transmission parameters from multiple groups of reference transmission parameters according to the group of transmission parameters, where N is a positive integer; and a receiving position determination module 430, configured to determine, according to the N groups of reference transmission parameters, one receiving position of a wireless energy receiving device corresponding to the wireless energy transmission device.

For the positioning device in the embodiment of the present application, a group of transmission parameters of a wireless energy transmission device are acquired, N groups of reference transmission parameters are determined according to the group of transmission parameters, and a receiving position of a wireless energy receiving device is further determined, thereby implementing positioning of the wireless energy receiving device.

The functions of the transmission parameter acquisition module 410, the reference transmission parameter determination module 420, and the receiving position determination module 430 are described in detail below with reference to the example embodiments.

The transmission parameter acquisition module 410 is configured to acquire a group of transmission parameters of a wireless energy transmission device.

In an example embodiment, the positioning device 400 may be integrated with the wireless energy transmission device. For example, the positioning device 400 is arranged as one functional module inside the wireless energy transmission device.

In an example embodiment, the transmission parameter comprises: at least one of an antenna array direction, an antenna array angle, and an antenna phase combination of the wireless energy transmission device.

In another example embodiment, the transmission parameter comprises: an antenna combination subset of the wireless energy transmission device, and at least one of an antenna array direction, an antenna array angle, and an antenna phase combination in the antenna combination subset. Compared with the former example embodiment, in this example embodiment, all antennas of the wireless energy transmission device are not configured to transmit energy to the wireless energy receiving device, and instead merely some of the antennas transmit energy to the wireless energy receiving device.

In an example embodiment, the transmission parameter acquisition module 410 is configured to acquire the group of transmission parameters of the wireless energy transmission device in response to that energy receiving efficiency of the wireless energy receiving device reaches a predetermined ratio of the highest efficiency at the receiving position.

In an example embodiment, the energy receiving efficiency η of the wireless energy receiving device is defined by the following formula:

$$\eta = \frac{e_{received}}{e_{sent}}$$

where $e_{received}$ is energy received by the wireless energy receiving device, and $e_{sent}$ is energy sent by the wireless energy sending device. Therefore, the energy receiving efficiency η of the wireless energy receiving device is a ratio of the energy received by the wireless energy receiving device to the energy sent by the wireless energy sending device. In an optimal lossless wireless energy transmission state, the energy receiving efficiency η is equal to 1, while in a common transmission state, the energy receiving efficiency η is a value smaller than 1. When the value is closer to 1, it indicates that a loss in a process of wireless energy transmission is smaller, and the energy receiving efficiency η is higher.

A value of the predetermined ratio may be 0% to 100%. In a case where the predetermined ratio is 100%, it represents that the group of transmission parameters of the wireless energy transmission device are acquired in response to that the energy receiving efficiency of the wireless energy receiving device reaches the highest efficiency at the receiving position.

Figure 5:
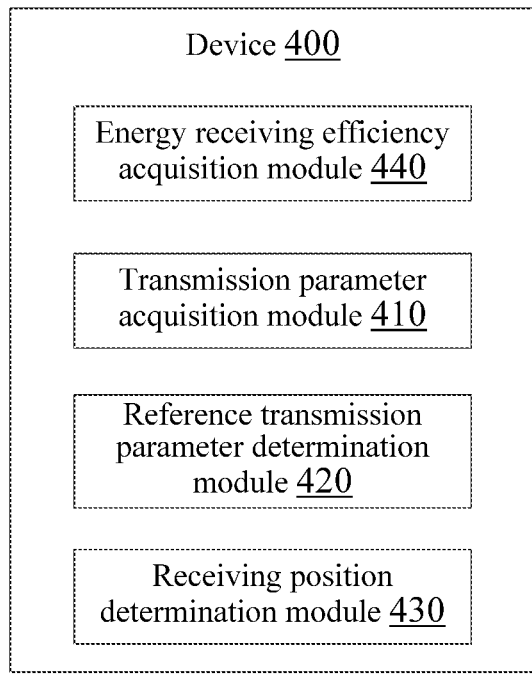
FIG. 5 is a schematic structural diagram of modules of the positioning device according to an example embodiment of the present application.

To monitor whether the energy receiving efficiency of the wireless energy receiving device reaches the predetermined ratio of the highest efficiency at the current position, in an example embodiment, referring to FIG. 5, the positioning device 400 further comprises:

an energy receiving efficiency acquisition module 440, configured to acquire the energy receiving efficiency of the wireless energy receiving device.

The wireless energy receiving device may actively or passively feedback energy receiving efficiency of the wireless energy receiving device to the positioning device at a fixed interval. In response to that the energy receiving efficiency of the wireless energy receiving device no longer increases along with adjustment of the transmission parameter of the wireless energy transmission device, it may be determined that the energy receiving efficiency of the wireless energy receiving device has reached the highest efficiency at a current position of the wireless energy receiving device. If the predetermined ratio is less than 100%, because the highest efficiency at the receiving position of the wireless energy receiving device cannot be known in advance, the transmission parameter of the wireless energy transmission device usually can be first adjusted till the receiving efficiency of the wireless energy receiving device reaches the highest efficiency, so that the receiving efficiency of the wireless energy receiving device is further adjusted to the predetermined ratio of the highest efficiency.

Under the influence of a distance between the wireless energy transmission device and the wireless energy receiving device and an obstacle between the wireless energy transmission device and the wireless energy receiving device, when the wireless energy receiving device is located at a different position, the highest energy receiving efficiency η that the wireless energy receiving device can obtain may be different. For example, in response to a case where a mobile phone is placed at a position near the wireless energy transmission device and there is no obstacle, the highest energy receiving efficiency η that the mobile phone can obtain may reach 80%. In response to a case where a tablet computer is placed at a position far away from the wireless energy transmission device and multiple obstacles exist between the tablet computer and the wireless energy transmission device, the highest energy receiving efficiency η that the tablet computer can obtain can only reach 40%.

In a case where the receiving efficiency η of the wireless energy receiving device reaches the highest efficiency at the current position, a one-to-one correspondence exists between the transmission parameter of the wireless energy transmission device and the receiving position of the wireless energy receiving device. When the receiving efficiency η of the wireless energy receiving device is less than the highest efficiency, for example, reaches 80% of the highest efficiency at the current receiving position where the wireless energy receiving device is located, a one-to-M correspondence exists between the transmission parameter of the wireless energy transmission device and the receiving position of the wireless energy receiving device, where M is a positive integer. Compared with an open environment such as an outdoor environment, in an environment having multiple obstacles, for example, an indoor environment, the value of M is smaller, for example, the value of M is 1, 2.

Therefore, in a case where the predetermined ratio is 100%, a one-to-one correspondence exists between the transmission parameter of the wireless energy transmission device and the receiving position of the wireless energy receiving device, a more desirable positioning effect is achieved for the wireless energy receiving device.

The reference transmission parameter determination module 420 is configured to determine N groups of reference transmission parameters from multiple groups of reference transmission parameters according to the group of transmission parameters, where N is a positive integer.

The reference transmission parameter determination module 420 may determine the N groups of reference transmission parameters on the basis of a degree of similarity between the group of transmission parameters and each group among the multiple groups of reference transmission parameters.

In an example embodiment, degrees of similarity between the N groups of reference transmission parameters and the group of transmission parameters are greater than a threshold. The threshold may be, for example, 90%.

In another example embodiment, the N groups of reference transmission parameters are N groups of reference transmission parameters having the highest degrees of similarity with the group of transmission parameters among the multiple groups of reference transmission parameters. Specifically, a degree of similarity between the group of transmission parameters and each of the multiple groups of reference transmission parameters may be calculated separately, the multiple groups of reference transmission parameters are arranged in a descending order of degree of similarity, and the first N reference transmission parameters are then used as the N groups of reference transmission parameters having the highest degrees of similarity with the group of transmission parameters. That is to say, the N groups of reference transmission parameters are the first N reference transmission parameters after the multiple groups of reference transmission parameters are arranged in a descending order of degrees of similarity with the group of transmission parameters.

The receiving position determination module 430 is configured to determine, according to the N groups of reference transmission parameters, one receiving position of a wireless energy receiving device corresponding to the wireless energy transmission device.

Figure 6:
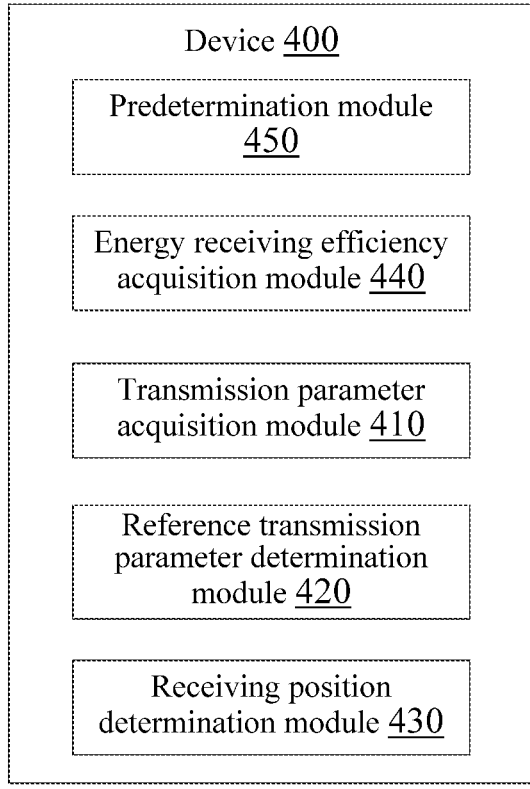
FIG. 6 is a schematic structural diagram of modules of the positioning device according to another example embodiment of the present application.

As discussed above, the N groups of reference transmission parameters correspond to at least N reference positions. In an example embodiment, the receiving position determination module 430 may be configured to determine the receiving position according to the at least N reference positions of the wireless energy receiving device corresponding to the N groups of reference transmission parameters. A correspondence between the reference transmission parameter and the reference position may be predetermined. In an example embodiment, referring to FIG. 6, the positioning device 400 may further comprise:

a predetermination module 450, configured to predetermine multiple reference receiving positions of the wireless energy receiving device corresponding to the multiple groups of reference transmission parameters.

Specifically, the wireless energy receiving device may be placed at a position in advance, the transmission parameter of the wireless energy transmission device is then adjusted till the receiving efficiency of the wireless energy receiving device reaches a predetermined ratio of the highest efficiency at a current position, and the current transmission parameter of the wireless energy transmission device and the position of the wireless energy receiving device corresponding to the transmission parameter are recorded. Similarly, multiple reference positions of the wireless energy receiving device corresponding to the multiple groups of reference transmission parameters may be obtained. In response to that the predetermined ratio is 100%, the number of the reference transmission parameters is equal to that of the reference positions. In response to that the predetermined ratio is smaller than 100%, the number of the reference transmission parameters may be smaller than that of the reference position.

In an example embodiment, N is 1, and the receiving position determination module 430 is configured to determine the receiving position according to at least one reference position of the wireless energy receiving device corresponding to the N groups of reference transmission parameters.

In a case where the predetermined ratio is 100%, one group of reference transmission parameters corresponds to only one reference position of the wireless energy receiving device, and the one reference position may be directly used as the receiving position.

In a case where the predetermined ratio is less than 100%, one group of reference transmission parameters may correspond to multiple reference positions of the wireless energy receiving device, one of the multiple reference positions may be randomly selected as the receiving position, or, a central point of the multiple reference positions is calculated as the receiving position.

Figure 7:
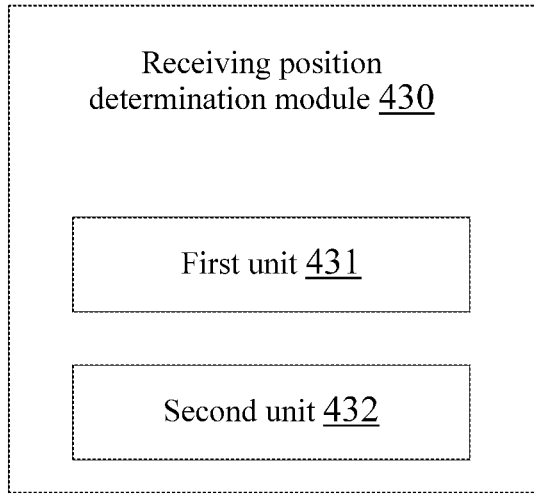
FIG. 7 is a schematic structural diagram of modules of the receiving position determination module according to an example embodiment of the present application.

In another example embodiment, N is greater than 1, and referring to FIG. 7, the receiving position determination module 430 comprises:

a first unit 431, configured to acquire the at least N reference positions of the wireless energy transmission device corresponding to the N groups of reference transmission parameters; and a second unit 432, configured to perform calculation according to the at least N reference positions to obtain the receiving position.

In a case where the predetermined ratio is 100%, N groups of reference transmission parameters correspond to N reference positions of the wireless energy receiving device, and a central point of the N reference positions may be calculated as the receiving position.

In a case where the predetermined ratio is less than 100%, one group of reference transmission parameters may correspond to multiple reference positions of the wireless energy receiving device, one of the multiple reference positions may be randomly selected as a representative reference position, or, a central point of the multiple reference positions as is calculated as a representative reference position. Similarly, in step S162, N representative reference positions may be obtained according to at least N reference positions corresponding to the N groups of reference transmission parameters, and further a central point of the N representative reference positions may be calculated as the receiving position.

Figure 8:
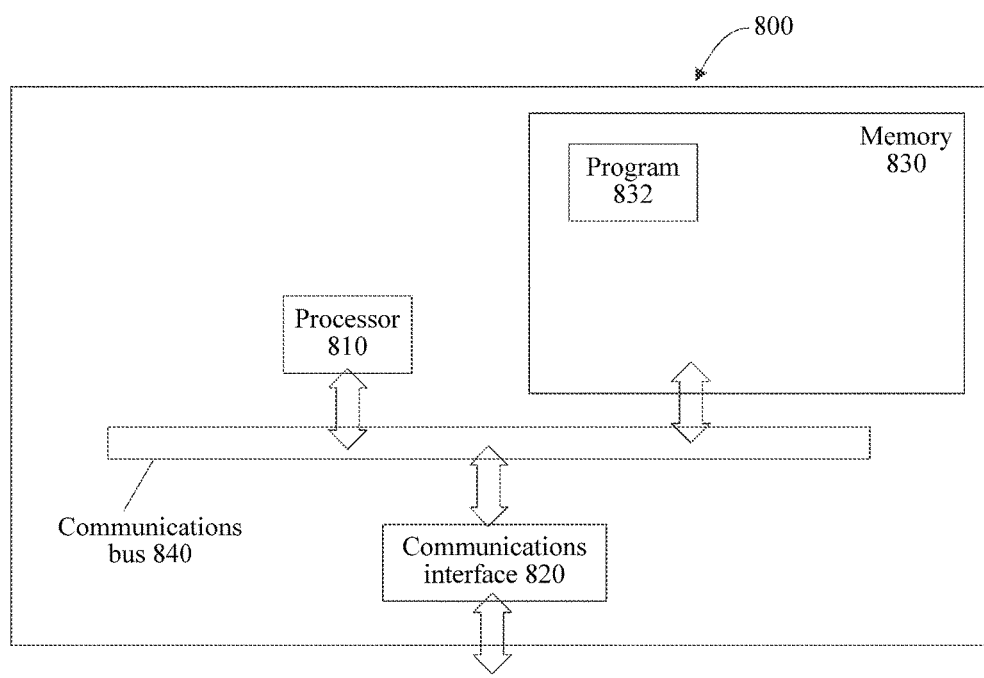
FIG. 8 is a schematic structural diagram of hardware of the positioning device according to an example embodiment of the present application.

FIG. 8 shows a structure of hardware of the positioning device according to an embodiment of the present application. The specific embodiments of the present application are not intended to limit the Example embodiments of the positioning device. As shown in FIG. 8, the device 800 may comprise:

a processor 810, a communications interface 820, a memory 830, and a communications bus 840.

The processor 810, the communications interface 820, and the memory 830 communicate with each other by using the communications bus 840.

The communications interface 820 is configured to communicate with another network element.

The processor 810 is configured to execute a program 832. Specifically, the processor 810 can perform relevant steps in the foregoing method embodiment shown in FIG. 1.

Specifically, the program 832 may comprise program code, where the program code comprises a computer operation instruction.

The processor 810 may be a central processing unit (CPU), an application specific integrated circuit (ASIC), or one or more integrated circuits configured to implement the embodiments of the present application.

The memory 830 is configured to store the program 832. The memory 830 may comprise a high-speed random access memory (RAM) memory, and may also comprise a non-volatile memory such as at least one magnetic disk memory. The program 832 can be specifically used to perform the following steps:

acquiring a group of transmission parameters of a wireless energy transmission device;

determining N groups of reference transmission parameters from multiple groups of reference transmission parameters according to the group of transmission parameters, where N is a positive integer; and determining, according to the N groups of reference transmission parameters, one receiving position of a wireless energy receiving device corresponding to the wireless energy transmission device.

For the Example embodiment of the steps in the program 832, refer to the corresponding steps and modules in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a controller, or a network device) or a processor to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The above example embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
   acquiring, by a system comprising a processor, a group of transmission parameters of a wireless energy transmission device;
   determining a number of groups of reference transmission parameters from multiple groups of reference transmission parameters according to the group of transmission parameters, wherein the number of groups of reference transmission parameters is a positive integer; and
   determining, according to the number of groups of reference transmission parameters, a receiving position of a wireless energy receiving device corresponding to the wireless energy transmission device,
   wherein the acquiring the group of transmission parameters of the wireless energy transmission device comprises:
      acquiring the group of transmission parameters of the wireless energy transmission device in response to determining that an energy receiving efficiency of the wireless energy receiving device has reached a predetermined ratio of a highest efficiency at the receiving position of the wireless energy receiving device according to a defined efficiency criterion.

2. The method of claim 1, further comprising:
   acquiring the energy receiving efficiency of the wireless energy receiving device.

3. The method of claim 1, wherein the number of groups of reference transmission parameters is at least two, and a degree of similarity between the number of groups of reference transmission parameters and the group of transmission parameters is determined to be greater than a threshold.

4. The method of claim 1, wherein the number of groups of reference transmission parameters is the number of groups of reference transmission parameters having the degree of similarity with the group of transmission parameters that is a highest degree of similarity among the multiple groups of reference transmission parameters.

5. The method of claim 1, wherein the determining, according to the number of groups of reference transmission parameters, the receiving position of the wireless energy receiving device corresponding to the wireless energy transmission device comprises:
   determining the receiving position of the wireless energy receiving device according to at least a number of reference positions of the wireless energy receiving device corresponding to the number of groups of reference transmission parameters.

6. The method of claim 5, wherein the number of groups of reference transmission parameters is 1, and the determining the receiving position of the wireless energy receiving device according to at least the number of reference positions of the wireless energy receiving device corresponding to the number of groups of reference transmission parameters comprises:
   determining the receiving position of the wireless energy receiving device according to at least one reference position of the wireless energy receiving device corresponding to the number of groups of reference transmission parameters.

7. The method of claim 5, wherein the number of groups of reference transmission parameters is greater than 1, and the determining the receiving position of the wireless energy receiving device according to at least the number of reference positions of the wireless energy receiving device corresponding to the number of groups of reference transmission parameters comprises:
   acquiring at least the number of reference positions of the wireless energy transmission device corresponding to the number of groups of reference transmission parameters; and
   determining the receiving position of the wireless energy receiving device according to at least the number of reference positions of the wireless energy transmission device.

8. The method of claim 1, wherein the receiving position of the wireless energy receiving device is a spatial coordinate position.

9. The method of claim 1, further comprising:
   predetermining multiple reference positions of the wireless energy receiving device corresponding to the multiple groups of reference transmission parameters.

10. The method of claim 1, wherein a transmission parameter of the group of transmission parameters comprises:
    an antenna combination subset of the wireless energy transmission device, and at least one of an antenna array direction, an antenna array angle, or an antenna phase combination in the antenna combination subset.

11. The method of claim 1, wherein a transmission parameter of the group of transmission parameters comprises:
    at least one of an antenna array direction, an antenna array angle, or an antenna phase combination of the wireless energy transmission device.

12. A device, comprising:
    a memory that stores executable modules; and
    a processor, coupled to the memory, that executes or facilitates execution of the executable modules, comprising:
       a transmission parameter acquisition module configured to receive a group of transmission parameters of a wireless energy transmission device;
       a reference transmission parameter determination module configured to determine N groups of reference transmission parameters from multiple groups of reference transmission parameters according to the group of transmission parameters, wherein N is a positive integer; and
       a receiving position determination module configured to determine, according to the N groups of reference transmission parameters, one receiving position of a wireless energy receiving device corresponding to the wireless energy transmission device,
       wherein the transmission parameter acquisition module is further configured to receive the group of transmission parameters of the wireless energy transmission device in response to a determination that an energy receiving efficiency of the wireless energy receiving device has reached a predetermined ratio of a highest efficiency at a current position.

13. The device of claim 12, wherein the executable modules further comprise:
    an energy receiving efficiency acquisition module configured to receive the energy receiving efficiency of the wireless energy receiving device.

14. The device of claim 12, wherein the receiving position determination module is further configured to determine the one receiving position of the wireless energy receiving device according to at least N reference positions of the wireless energy receiving device corresponding to the N groups of reference transmission parameters.

15. The device of claim 14, wherein N is 1, and the receiving position determination module is configured to determine the one receiving position of the wireless energy receiving device according to at least one reference position of the wireless energy receiving device corresponding to the N groups of reference transmission parameters.

16. The device of claim 14, wherein N is greater than 1, and the receiving position determination module comprises:
   a first unit configured to acquire at least the N reference positions of the wireless energy transmission device corresponding to the N groups of reference transmission parameters; and
   a second unit configured to perform a calculation according to at least the N reference positions to obtain the one receiving position of the wireless energy receiving device.

17. The device of claim 12, wherein the executable modules further comprise:
   a predetermination module configured to predetermine multiple reference receiving positions of the wireless energy receiving device corresponding to the multiple groups of reference transmission parameters.

18. A computer readable storage apparatus, comprising at least one executable instruction, which, in response to execution, causes a device comprising a processor to perform operations, comprising:
   acquiring transmission parameters of a wireless energy transmission device;
   determining N groups of reference transmission parameters from multiple groups of reference transmission parameters according to the transmission parameters, wherein N is a positive integer; and
   determining, according to the N groups of reference transmission parameters, a receiving position of a wireless energy receiving device corresponding to the wireless energy transmission device,
   wherein the acquiring the transmission parameters of the wireless energy transmission device comprises:
      acquiring the transmission parameters of the wireless energy transmission device in response to determining that an energy receiving efficiency of the wireless energy receiving device has reached a predetermined ratio of a highest efficiency at the receiving position of the wireless energy receiving device according to a defined efficiency criterion.

19. The computer readable storage apparatus of claim 18, wherein the operations further comprise:
   acquiring the energy receiving efficiency of the wireless energy receiving device.

20. A positioning device, comprising a processor and a memory, the memory storing executable instructions, the processor being connected to the memory via a communication bus, and, when the positioning device operates, the processor executing or facilitating executing the executable instructions stored in the memory, so that the positioning device executes operations, comprising:
   acquiring a group of transmission parameters of a wireless energy transmission device;
   determining a number of groups of reference transmission parameters from groups of reference transmission parameters according to the group of transmission parameters, wherein the number of groups of reference transmission parameters is a positive integer; and
   determining, according to the number of groups of reference transmission parameters, at least one receiving position of a wireless energy receiving device corresponding to the wireless energy transmission device,
   wherein the acquiring the group of transmission parameters of the wireless energy transmission device comprises:
      acquiring the group of transmission parameters of the wireless energy transmission device in response to determining that an energy receiving efficiency of the wireless energy receiving device has reached a predetermined ratio of a highest efficiency at the at least one receiving position of the wireless energy receiving device according to a defined efficiency criterion.

21. The positioning device of claim 20, wherein the operations further comprise:
   acquiring the energy receiving efficiency of the wireless energy receiving device.

* * * * *